(No Model.)
H. M. TILESTON.
VENTILATED EYE GUARD.
No. 513,603. Patented Jan. 30, 1894.
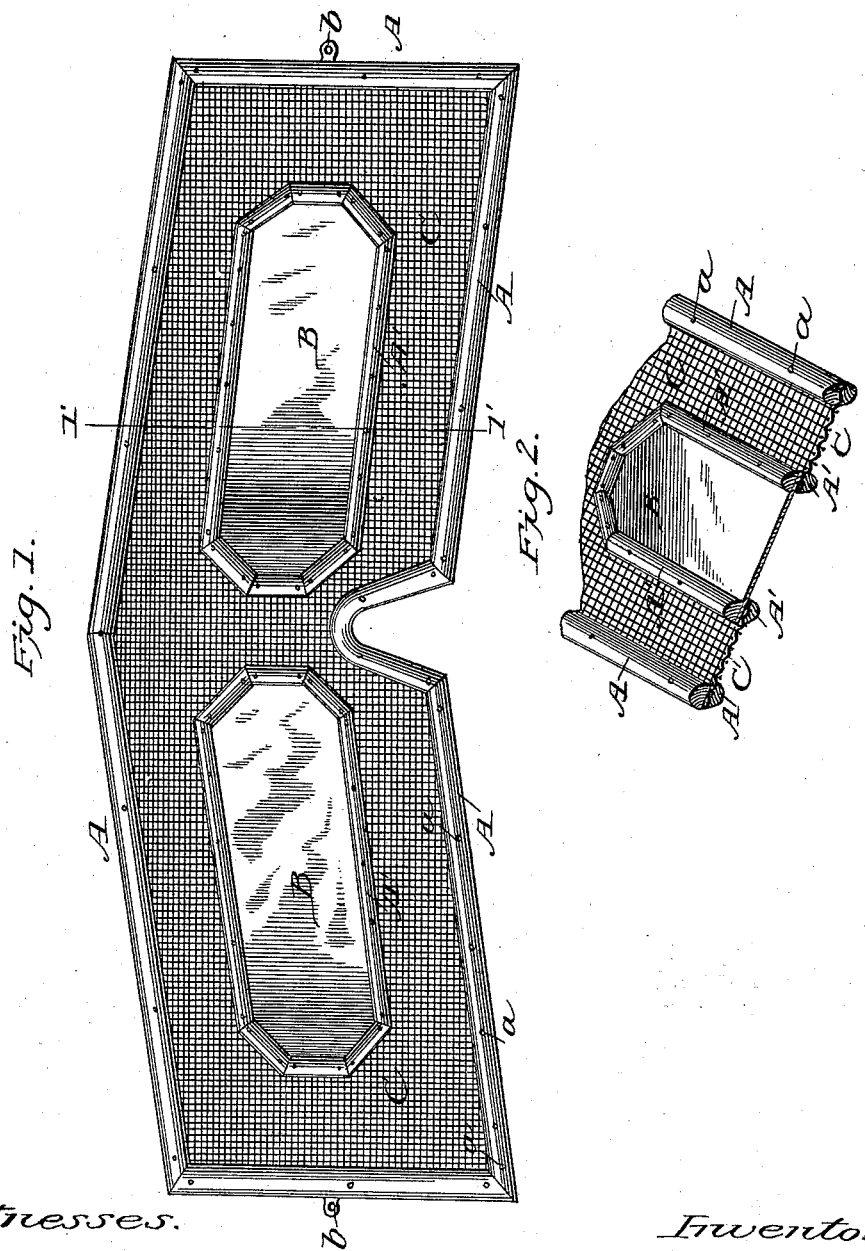
Witnesses.
Emma Stanfield.
Wm H. Moyer.
Inventor.
Henry M. Tileston

UNITED STATES PATENT OFFICE.

HENRY MERRILL TILESTON, OF KANSAS CITY, MISSOURI.

VENTILATED EYE-GUARD.

SPECIFICATION forming part of Letters Patent No. 513,603, dated January 30, 1894.

Application filed March 14, 1893. Serial No. 465,935. (No model.)

*To all whom it may concern:*

Be it known that I, HENRY MERRILL TILESTON, a citizen of the United States, residing at Kansas City, in the county of Jackson and State of Missouri, have invented a new and useful Improvement in Ventilated Eye-Guards, as set forth in the accompanying drawings, forming part of this specification, in which—

Figure 1, is a front view of an eye-guard embodying my invention, showing a frame composed of flexible ventilated material; an outer rim of flexible substance and elongated centers or lenses of transparent or semi-transparent material held in position by an inner rim of flexible material. Fig. 2. is a perspective view of a sectional portion of Fig. 1, on the lines 1'. 1', showing one manner of construction.

My invention is to provide a flexible eye-guard that is ventilated by means employed in its construction which allows the air to circulate through the frame or portions thereof, while protecting the wearer against various annoyances, still, gives to the eye, unobstructed by frame material, full scope of vision.

My invention also consists of constructions which I shall fully hereinafter describe and claim.

To enable others skilled in the art to which my invention appertains to make and use the same I will now describe its construction and indicate the manner in which the same is carried out and its various uses.

Letters herein employed correspond with like letters in the drawings.

In the said drawings A represents the outer or marginal rim, constructed of longitudinal half round pieces of material or other suitable flexible material, between which or to which the edges of the ventilated flexible material C are held, being riveted, sewed or by other suitable means held in position. The inner rims A', surrounding the elongated flexible centers or flexible lenses B, may be constructed of the same material as the marginal rim A or of other suitable material which will hold the lenses or centers in position and to the flexible ventilated material C. The rims may be constructed of metal, gutta percha, cloth or any suitable flexible substance, held together by rivets $a$, $a$, $a$, or sewed, or by other means fastened to the ventilated portion of the frame.

The ventilated portion of the frame holding the elongated centers or lenses may be of any perforated or porous substance which will permit the circulation of air and yet obstruct partially or entirely the passage of dust, insects or other substances liable to annoy or do injury to the wearer and I employ such material as hair cloth, wire gauze, perforated sheet metal, or other suitable flexible material.

The lenses may be transparent or semi-transparent of any flexible nature and if desired waterproof I use mica, flexible glass, or other suitable material. However it is not essential at all times to employ the use of waterproof material in which event I use veiling, wire gauze, bolting cloth or other suitable material for the centers.

The centers or lenses are elongated to cover beyond the outer corners of the eye, thus enabling the wearer to obtain full scope for the use of the eye without necessitating turning the head.

The eye-guard is held in position in front of the eyes by means of elastic cord or suitable fastenings attached to the sides at $b$ or by means of the ordinary spectacle bow with fastening adapted to apply when the eye-guard should be reversed.

Due allowance must be made in construction for the eye-guard to conform to the features of the face.

The eye-guard may be made to cover the nose, ears or other portions of the face if desired.

The eye-guard is adapted to many uses, as a protection against dirt, dust, cinders, insects, glare of the sun, snow, sleet, and other substances found in the atmosphere and is of great convenience to travelers, invalids, laborers, fishermen, hunters, horsemen, and others whose occupation or pursuits require protection for the eyes.

With the ventilating frame this eye-guard relieves the wearer from the discomforts found in many other devices used for this purpose. The lenses or centers can be made of any degree of transparency thus resting the weak eyes and the construction of the eye-guard is such that it can be reversed or an interchange of lenses and centers made if desired.

Having thus described my invention, which is simple, useful, durable, and a comfortable guard for the protection of the eyes, what I claim as new, and desire to secure by Letters Patent, is—

1. A flexible ventilated eye-guard consisting of an outer flexible rim inclosing a flexible ventilated frame surrounding the orbital space having flexible lenses secured thereto in the manner and for the purpose substantially as described.

2. A flexible ventilated eye-guard consisting of an outer flexible rim inclosing a flexible ventilated inner frame surrounding the orbital space having inter-changeable flexible lenses secured thereto in the manner, substantially as described.

3. The combination in an eye-guard composed of an outer flexible rim A, of an inner flexible ventilated frame C, of the flexible lenses B and the fastenings therefor substantially as described.

4. The combination of an outer flexible rim, having an inner flexible ventilated frame surrounding the orbital space with flexible changeable lenses thereto secured forming a reversible flexible ventilated eye-guard in the manner and for the purpose substantially as described.

HENRY MERRILL TILESTON.

Witnesses:
CHARLES G. UPTON,
R. S. BARNHILL.